United States Patent
Kang

(10) Patent No.: US 7,107,143 B2
(45) Date of Patent: Sep. 12, 2006

(54) ESTIMATION OF OXYGEN CONCENTRATION IN THE INTAKE MANIFOLD OF AN UNTHROTTLED LEAN BURN ENGINE

(75) Inventor: Jun-Mo Kang, Ann Arbor, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 11/112,434

(22) Filed: Apr. 22, 2005

(65) Prior Publication Data

US 2006/0020386 A1 Jan. 26, 2006

Related U.S. Application Data

(60) Provisional application No. 60/589,690, filed on Jul. 21, 2004.

(51) Int. Cl.
  G06F 19/00 (2006.01)
  G06F 6/00 (2006.01)
(52) U.S. Cl. .................. 701/114; 123/480; 123/568.16
(58) Field of Classification Search ............... 701/114, 701/101, 103, 108, 109; 123/480, 478, 568.16, 123/568.21, 492
See application file for complete search history.

(56) References Cited

U.S. PATENT DOCUMENTS 5,205,260 A * 4/1993 Takahashi et al. .......... 123/494
6,360,726 B1 * 3/2002 Javaherian .................. 123/491
6,871,134 B1 * 3/2005 Lange et al. ................ 701/108
2006/0054134 A1 * 3/2006 Henn et al. ................. 123/325

OTHER PUBLICATIONS

"Air Charge Estimation in Camless Engines", M. J. van Nieuwstadt, I. V. Kolmanovsky, M. Haghgooie, and M. Hammoud, SAE paper 2001-01-0581.
"Observers for Linear Systems with Unknown Outputs", P. Kudva, N. Viswanadham, and A. Ramakrishna, IEEE Transactions on Automatic Control, vol. 25, No. 1, pp. 113-115, Feb. 1980.
"Nonlinear Reduced-Order State and Parameter Observer", D. A. Haessig and B. Friedland, Proceedings of American Control Conference, pp. 1978-1980, Arlington, VA, Jun. 2001.
"Simple Unknown Input Estimation Techniques for Automotive Applications", A. Stotsky and I . Kolmanovsky, Proceedings of American Control Conference, pp. 3312-3317, Arlington, VA, Jun. 2001.

* cited by examiner

Primary Examiner—John T. Kwon
(74) Attorney, Agent, or Firm—Kathryn A. Marra

(57) ABSTRACT

A method of estimating oxygen concentration in the intake of a lean burn engine is accomplished during throttled operation by repeatedly combining determined air/fuel ratio and intake mass air flow and estimated cylinder mass flow and exhaust gas recirculation flow in a state observer, which calculates exhaust and intake burned gas fractions and resulting percent oxygen in the intake manifold. During unthrottled operation, estimation is corrected by an adaptive disturbance estimator, which operates to correct all input disturbances under conditions of higher EGR and to correct only MAF flow values under lower EGR conditions. Steps for operation of the state observer and for determining or estimating input conditions to the state observer are set forth.

7 Claims, 5 Drawing Sheets

ESTIMATION OF OXYGEN CONCENTRATION IN THE INTAKE MANIFOLD OF AN UNTHROTTLED LEAN BURN ENGINE

CROSS-REFERENCE TO RELATED APPLICATIONS

This application claims priority from U.S. Provisional Patent Application No. 60/589,690 filed Jul. 21, 2004.

TECHNICAL FIELD

This invention relates to a method for estimation of intake manifold oxygen concentration in unthrottled lean burn engines.

BACKGROUND OF THE INVENTION

It is known in the art relating to lean-burn engines, that the oxygen concentration in the intake manifold has an impact on combustion and emissions by changing constituents of the cylinder charge. In order to estimate the oxygen concentration in the intake manifold, it is required to measure or estimate air flow, EGR flow, and the flow into the cylinder. In a standard engine, air flow is measured by a Mass Air Flow (MAF) sensor at the throttle body.

A conventional, low-cost MAF sensor is insensitive to the flow direction, and it usually works well since the intake manifold pressure is controlled by throttle to be less than ambient pressure in most engine operating conditions, and as a result, the flow is one directional from the throttle body to the intake manifold. However, under unthrottled operating conditions, the intake manifold pressure becomes nearly ambient, and resonance waves can occur through intake systems. Those waves travel through the intake manifold, and may cause reverse flows upstream of the intake manifold where the MAF sensor is typically located.

It has been shown that a conventional, directionally insensitive MAF sensor significantly overestimates air flow due to those reverse flows, especially at low air flow as seen in FIG. 1. In the figure, the solid diagonal line 10 represents mass air flow into the engine measured at a calibrated orifice upstream of the engine intake. The separate squares 12 show individual readings of a hot wire MAF sensor at air flows of 0–200 kg/h. It is seen that below about 100 kg/h, the intake manifold pressure sensor readings are increasingly high. It has also been noted that even specially designed MAF sensors, which are only sensitive to forward directional flow, do not improve the accuracy much at low air flow, since air flow becomes unsteady as indicated by large cycle-to-cycle variations and frequency doubling.

Also, given a mass air flow, EGR flow can be estimated by subtracting the mass air flow from the mass flow into the cylinder based on an assumption that intake manifold dynamics are fast enough to ignore, which is true when the engine is operating under unthrottled operating conditions. For an engine equipped with conventional intake and exhaust valves, the mass flow into the cylinder can be estimated based on the volumetric efficiency, the engine speed, and the intake temperature, etc. The volumetric efficiency depends on operating conditions, and requires extensive calibrations for accurate estimation. Thus, the estimated EGR flow using this method would contain uncertainty as long as measured mass air flow and/or estimated mass flow into the cylinder are inaccurate.

SUMMARY OF THE INVENTION

To improve accuracy of the intake manifold oxygen concentration estimation, the present invention provides a model-based estimation method. The method consists of two parts for improved estimation, a state observer and an adaptive disturbance estimator. In the method, the uncertainty due to the inaccurate flow measurements/estimates, as discussed, is considered a disturbance to the system, and is compensated for by the adaptive disturbance estimator, which, in turn, improves the performance of the state observer.

These and other features and advantages of the invention will be more fully understood from the following description of certain specific embodiments of the invention taken together with the accompanying drawings.

DESCRIPTION OF THE PREFERRED EMBODIMENT

Figure 1:
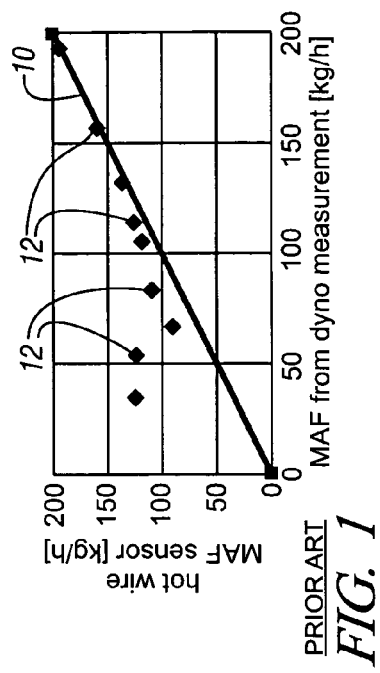
FIG. 1 is a graph showing mass air flow sensor departures from a range of actual intake flows in an unthrottled engine.
Figure 2:
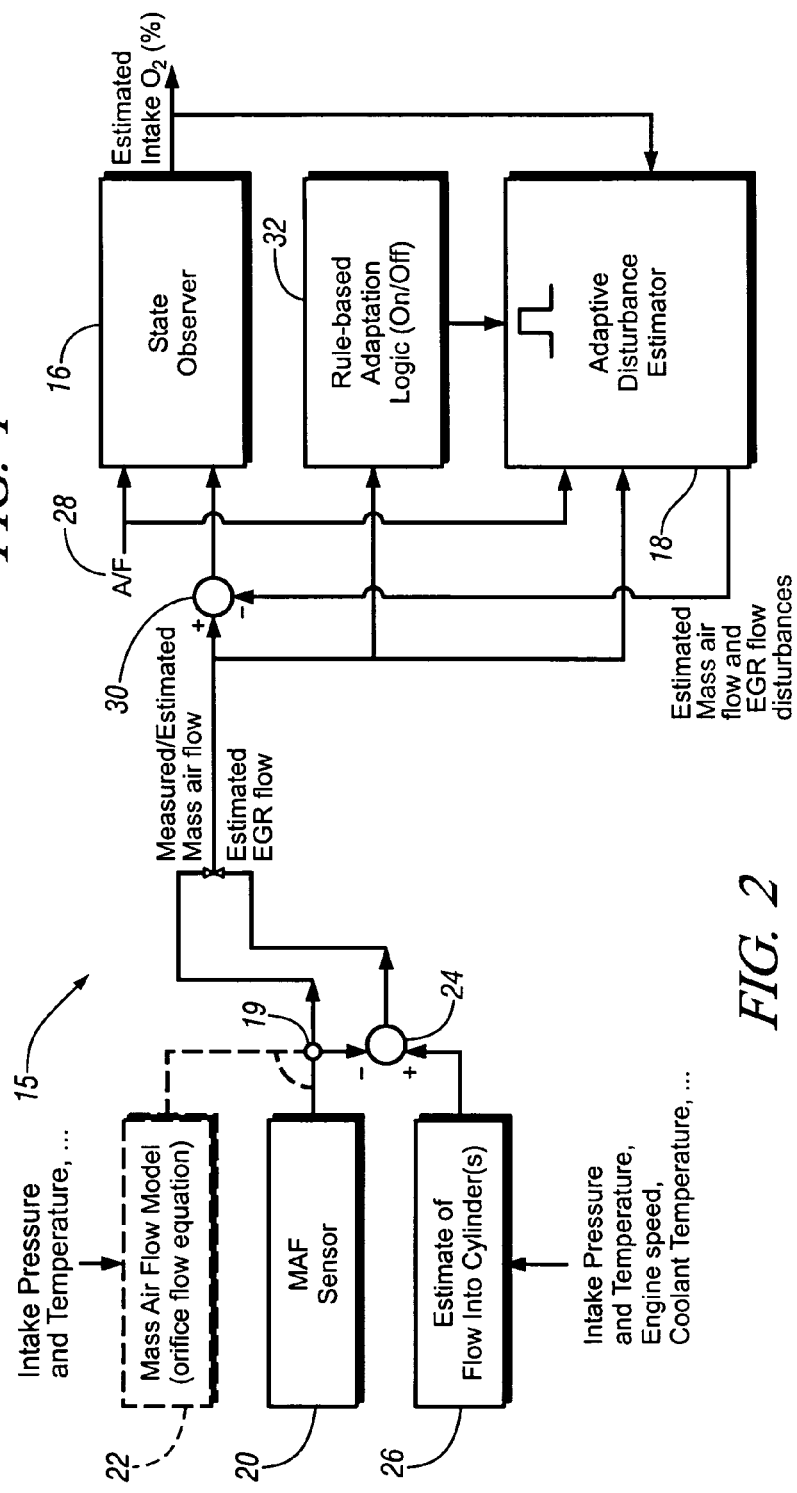
FIG. 2 is a block diagram indicating unthrottled engine operation of an intake $O_2$ estimator according to the invention.

Referring to FIG. 2, numeral 15 generally indicates a block diagram indicating unthrottled engine operation of an intake $O_2$ estimator according to the invention. The estimator includes two main components: a state observer 16 and an adaptive disturbance estimator 18. Mass air flow to the intake manifold can, through a suitable control 19, be measured by a MAF sensor 20, or estimated 22 based on measured intake manifold pressure and temperature using the orifice flow equation. Either way, uncertainty is unavoidable under unthrottled operating conditions, since mass air flow is extremely sensitive to intake manifold pressure, and flow calculation based on the orifice equation is prone to error, due to such extreme sensitivity.

In the case where the mass air flow is calculated based on the orifice flow equation and measured intake manifold pressure and temperature, the calculated mass air flow tends to have high frequency components, due to the extreme sensitivity to the intake manifold pressure under unthrottled engine operation. Thus, the calculated mass air flow should be filtered with a low-pass-filter for a smooth mass air flow estimation. Once the mass air flow is measured/estimated, exhaust gas recirculation (EGR) flow is estimated 24 by subtracting the mass air flow from the mass flow into the cylinder(s) 26, estimated from intake pressure and temperature, engine speed and coolant temperature, etc., under unthrottled engine operating conditions.

The state observer 16 is designed based on the dynamic intake and exhaust manifold model to estimate the burned gas fractions in intake and exhaust manifolds by assuming that precise mass air flow and mass flow into the cylinder (hence, EGR flow) are available. Indeed, when an engine operates with intake manifold pressure less than 95 kPa (operating under throttled conditions), mass air flow at the throttle body can be accurately measured (or calculated using the orifice flow equation) and mass flow into the cylinder and EGR flow can be estimated closely by incorporating intake manifold dynamics.

In a lean-burn engine, the burned gas fraction in the exhaust manifold can be directly calculated from the measurement 26 of a wide-range air fuel ratio sensor at the exhaust pipe. Then, the state observer is further simplified using a technique, such as a reduced-order observer design method. Based on the wide-range air/fuel ratio measurement 28, the reduced order state observer 16 is exclusively used to estimate the burned gas fraction in the intake manifold in real-time. Then, the intake manifold oxygen concentration is derived by the state observer from the estimated burned gas fraction in the intake manifold based on constituents of dry air using Dalton's law.

The uncertainty in the mass air flow measurement/estimate and EGR flow estimate under unthrottled operations, as described earlier, can be regarded as a disturbance to the state observer, and can lead to inaccurate estimation of intake manifold oxygen concentration. To compensate for the effect of disturbance on the state observer, the adaptive disturbance estimator 18 is designed using methodologies available in the literature to estimate disturbances in the flow measurement/estimate. Once the disturbances are estimated, the flow measurement/estimate is corrected by subtracting those estimated disturbances 30.

A difficulty in applying the adaptive disturbance estimator is that it requires the time derivative of the exhaust burned gas fraction. Usually, using the time derivative of the measurement should be avoided since the measurement contains noise. Nevertheless, the time derivative of the exhaust burned gas fraction can be approximated using a technique such as sliding mode observer, dirty differentiation. Stability of the proposed method can be proved if the persistent excitation (PE) condition is satisfied. However, depending on the engine operating conditions, lack of a persistent excitation condition may inevitably occur in a real application.

For example, the disturbance estimate of EGR flow might have poor excitation if EGR flow is too small relative to mass air flow. It follows that, if there is not enough excitation, convergence of the adaptive system may be extremely slow, and even drift, ending up with estimating incorrect values, which might lead to instability of the system.

A typical solution to lack of persistent excitation is simply to turn off the adaptation once poor excitation is detected. Thus, a heuristic rule 32 depending on mass flows is devised to activate and deactivate the adaptation as follows:

If a ratio of EGR flow/mass flow into the cylinder is greater than or equal to $\epsilon$,
Activate the adaptation for all disturbances;

Otherwise,
Activate the adaptation only for disturbance of mass air flow.

The parameter $\epsilon$ is a constant threshold between 0 and 1.

Basically, the rule 32 is to turn off the EGR disturbance adaptation when EGR flow has a relatively smaller magnitude than the mass air flow. The adaptation threshold, $\epsilon$, is a design parameter, and must be tuned based on the experimental data.

Figure 3:
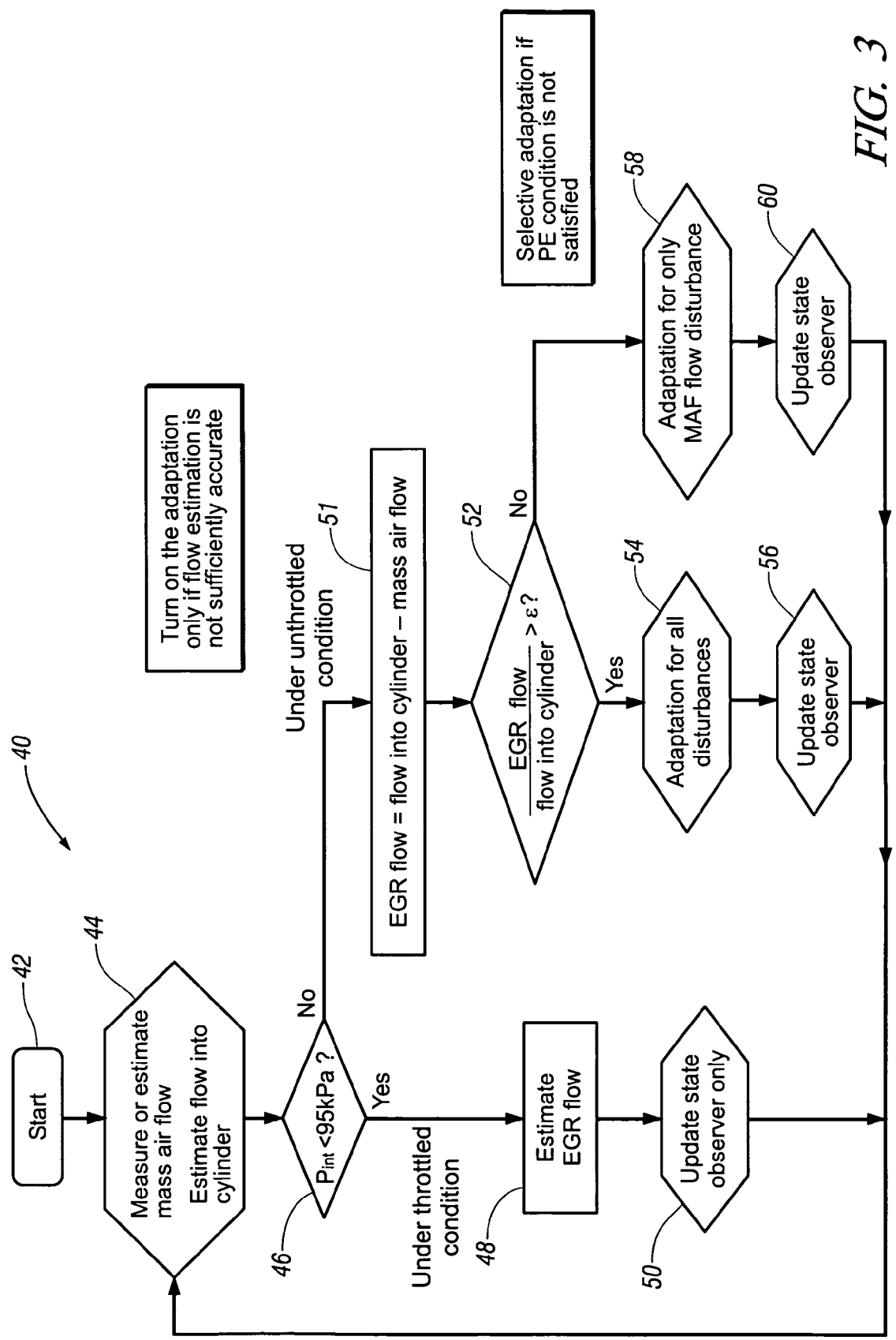
FIG. 3 is a flow chart of adaptation logic for improving the method of estimation of $O_2$ concentration according to the invention.

Referring now to FIG. 3 of the drawings in detail, numeral 40 generally indicates a flow chart indicating steps in the method of the present invention. The program is started at box 42, when operation of an engine is initiated. At box 44, the mass air flow into the intake manifold is measured or estimated and mass flow from the intake manifold to the engine cylinder(s) is estimated.

At box 46, it is determined if intake manifold pressure is less than a predetermined value, such as 95 kPa. If so (operating under throttled conditions), then the mass air flow 44 and EGR flow 48 are assumed to be reasonably accurate (as discussed) and, at box 50, are used to update the state observer 16 (FIG. 2). The process then returns to box 44 for repetition of the previous steps.

If intake manifold pressure is greater than the predetermined value (operating under unthrottled conditions), EGR flow is then estimated at box 51 by subtracting the mass air flow into manifold from the mass air flow into the engine cylinder(s). The process then continues to the adaptive disturbance estimator at box 52.

Box 52 determines whether the EGR flow divided by the sum of EGR and mass air flow (hence, mass flow into engine cylinder(s)) is greater than a threshold value $\epsilon$, set between 0 and 1 based on engine test data. If EGR flow is relatively large and the result is greater than or equal to $\epsilon$, then the adaptive disturbance estimator is operated at box 54 for EGR flow as well as for mass air flow. The adjusted values of mass air flow and EGR flow are then used to update the state observer at box 56. If EGR flow is relatively small and the result is less than $\epsilon$, its estimation may not be needed and box 58 calls for adaptation of mass air flow only. These results are then used to update the state observer 16 at box 60.

Thus, estimation by the state observer 16 is updated regularly based on the then current engine operating conditions and, if operating conditions require, the update is modified by adaptive adjustments of the estimates for differences in mass air flow and, if needed, EGR flow. These steps are taken in accordance with the details of the method steps outlined previously.

To evaluate the performance of the method, the method was applied to a set of experimental data taken from a diesel engine, equipped with a turbocharger. The oxygen sensors and thermocouples, as well as the pressure sensors, were implemented to measure the states of both intake and exhaust manifolds. In addition, MAF was measured upstream of the intake manifold.

Since the engine is equipped with a turbocharger, the MAF sensor can measure air flow with good precision, as boosted pressure upstream of the intake manifold substantially reduces backflows. Nonetheless, it was assumed that the MAF sensor was not available, and the mass air flow was estimated using the orifice flow equation by measuring the boost pressure, which is nearly identical with the intake manifold pressure. In this way, an intake manifold condition similar to an unthrottled naturally aspirated engine was emulated.

Based on the mass air flow estimate, the EGR flow rate was estimated using the method discussed earlier. The estimated mass air flow and EGR flow had been filtered with a first-order low pass filter, with a time constant of 1 second, before they were applied to the method, to reduce high frequency components that might excite the unmodeled dynamics of the system. Also, the adaptation threshold, $\epsilon$, was tuned to be 0.5.

Figure 4:
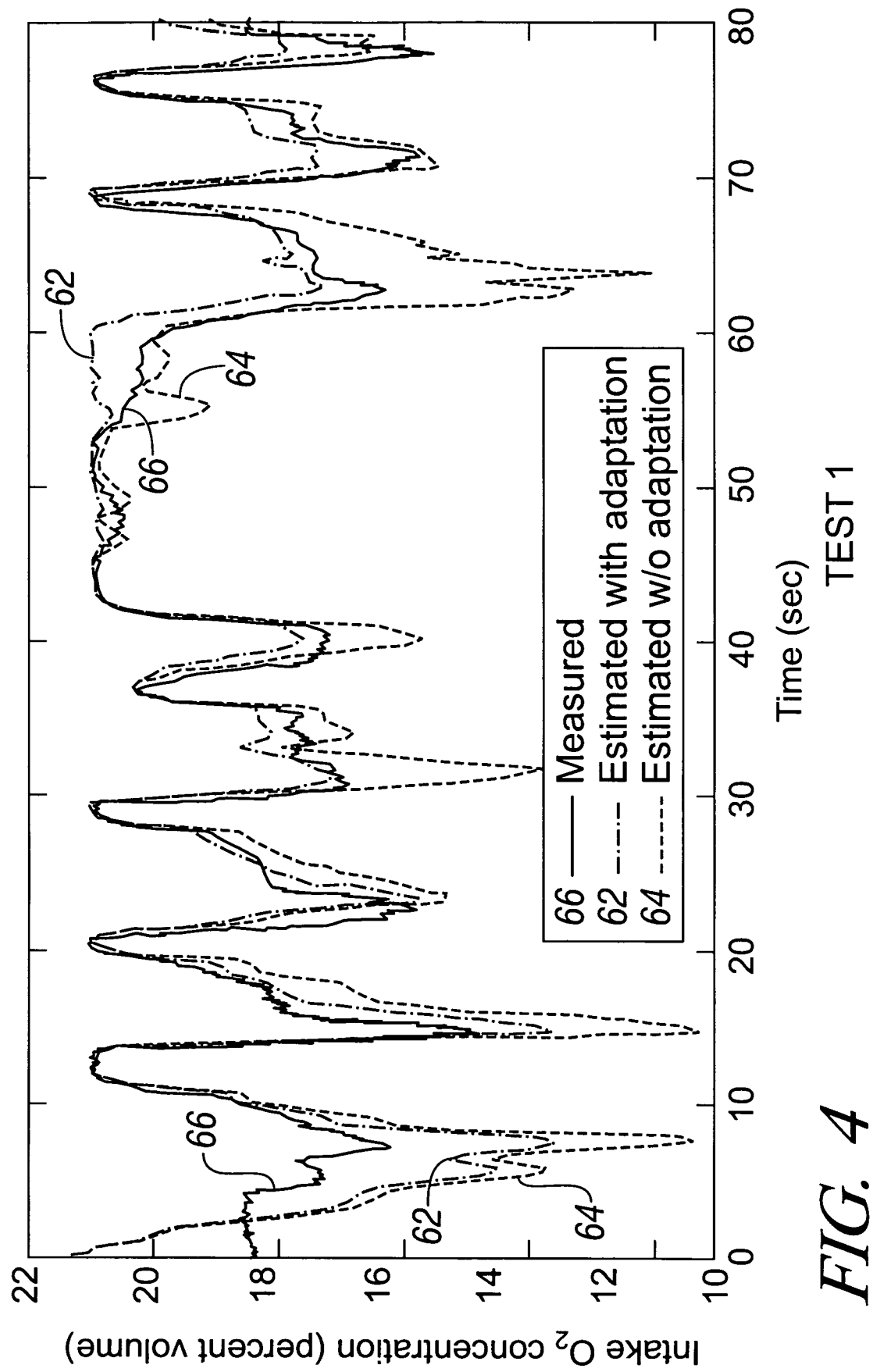
FIG. 4 is a graph comparing test results of measured intake manifold $O_2$ concentration with estimated values with and without adaptation.

The resulting intake manifold oxygen concentration estimations are plotted in FIG. 4, as line 62 with adaptation and line 64 without adaptation, together with the actual oxygen concentration measurement in the intake manifold, line 66 (test 1). It is seen that the reduced-order state observer has a large estimation error due to disturbance in the mass air flow and EGR flow estimates, whereas the estimation error of the same observer with the adaptive disturbance estimator is significantly reduced.

Figure 5:
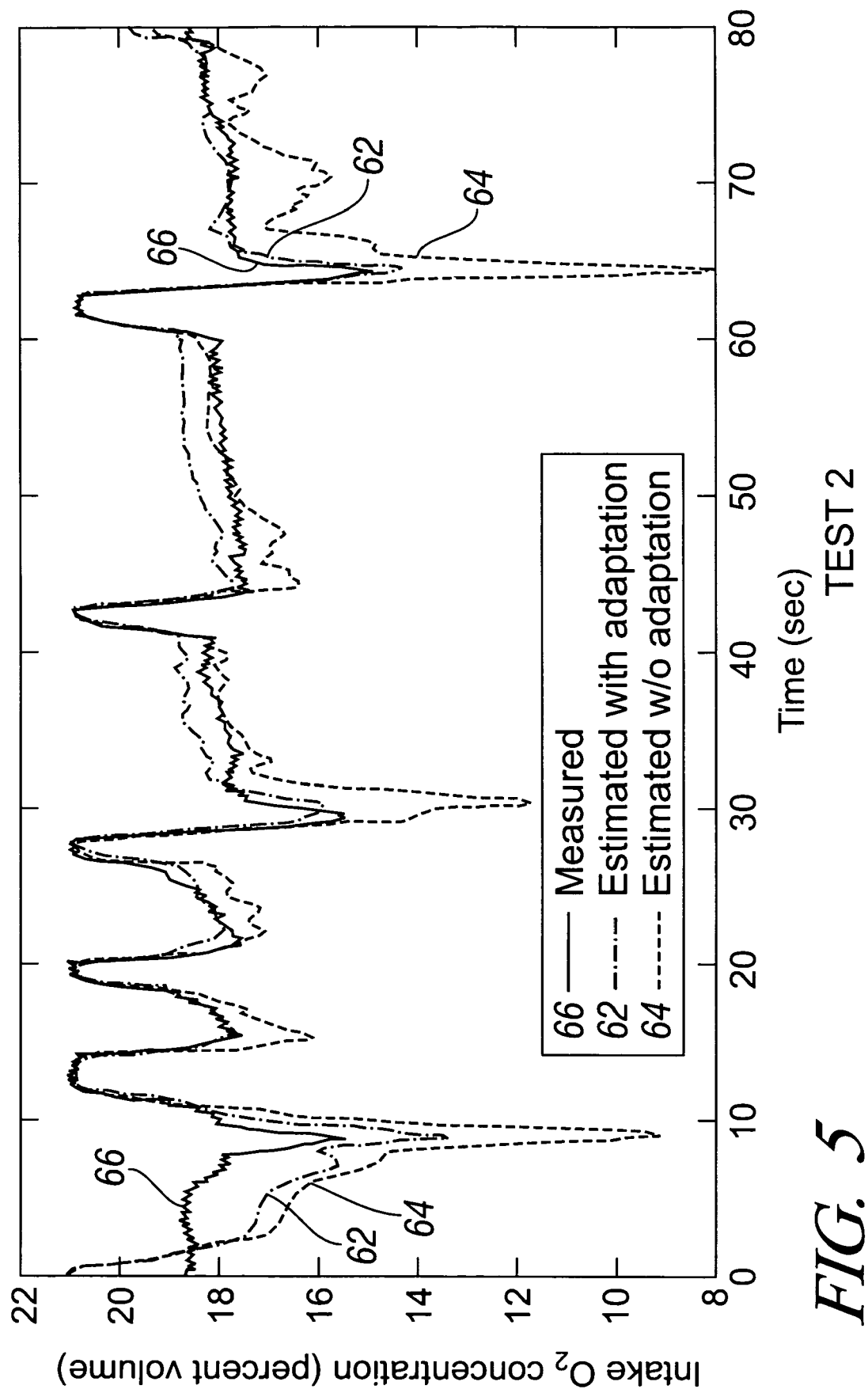
FIGS. 5 and 6 are graphs similar to FIG. 4 plotting further tests and estimated values.
Figure 6:
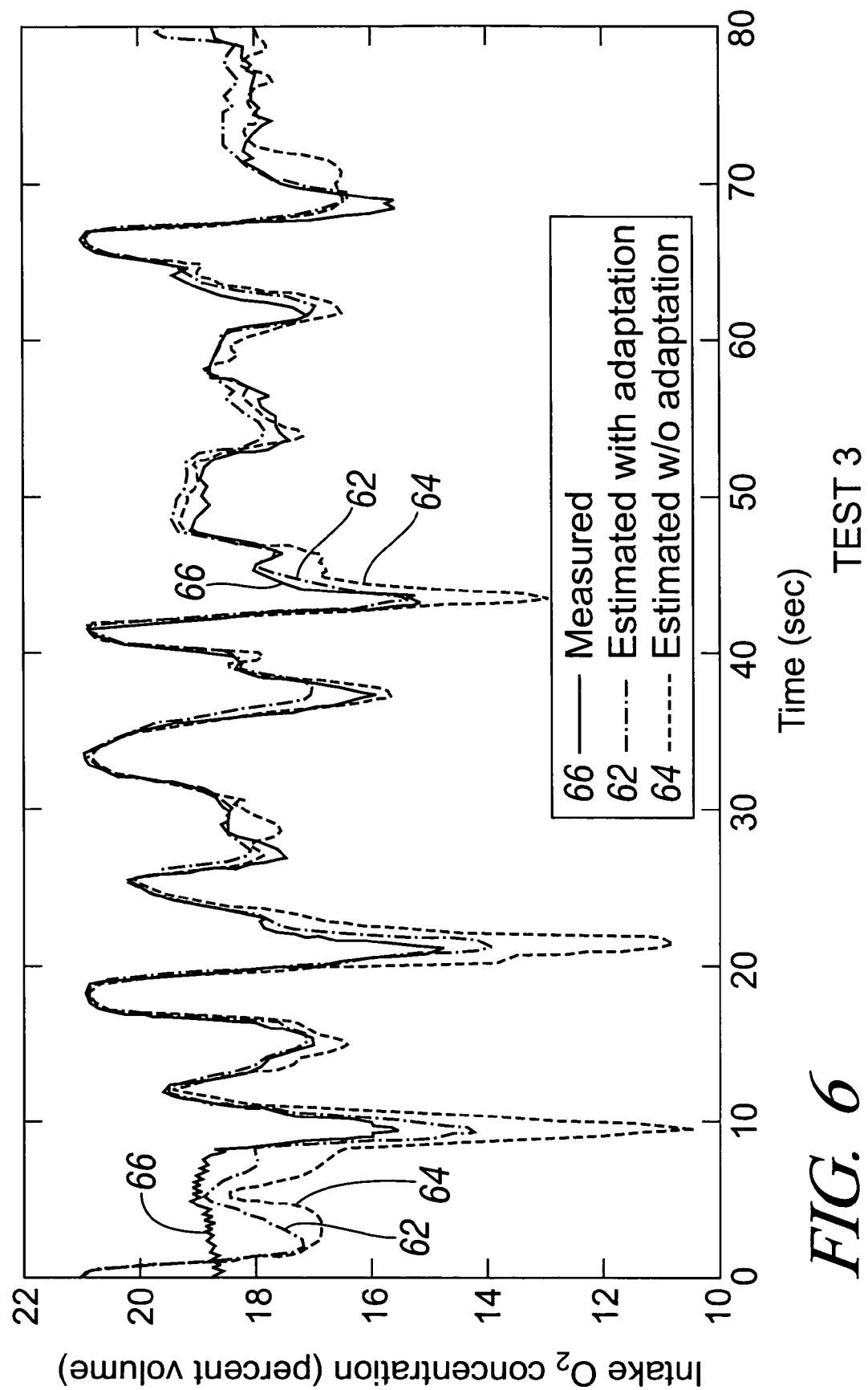

The method was also applied to two additional sets of experimental data in tests 2 and 3. The results are shown in FIGS. 5 and 6, respectively. These figures show that the estimation method of the invention substantially reduces the estimation error of the intake manifold oxygen concentration, as was the case in test 1.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A method for repeatedly estimating intake manifold oxygen concentration during operation of a lean burn engine, the method comprising the steps of:
   (1) operating a state observer (SO) by combining determined air/fuel ratio (A/F) and mass air flow (MAF), and estimated cylinder mass flow (CMF) and exhaust gas recirculation flow (EGR) and calculating percent oxygen ($O_2$) in the intake manifold;
   (2) if intake manifold pressure is sufficiently less than atmospheric pressure (atm) to indicate throttled operation, continually repeating step 1; if not, operating adaptive disturbance estimator (ADE);
   (3) if EGR/CMF is greater than a predetermined threshold value between 0 and 1, operating ADE to correct all disturbances and adjusting accordingly the values input to the SO, if not, then operating ADE to correct only MAF values and continually repeating steps 1–3.

2. A method as in claim 1 including:
   determining A/F from readings of a wide range air/fuel ratio sensor in the exhaust;
   deriving from A/F, in lean burn operation, a burned gas fraction in the exhaust;
   estimating a burned gas fraction in the intake manifold from the burned gas fraction in the exhaust and calculating from the intake manifold burned gas fraction the percent $O_2$ in the intake manifold.

3. A method as in claim 1 including determining MAF by one of the steps of measuring with a sensor and, estimating from a mass air flow model using intake pressure and temperature applied in the orifice flow equation.

4. A method as in claim 3 including estimating CMF from engine and intake air conditions.

5. A method as in claim 4 including estimating EGR as CMF minus MAF.

6. A method as in claim 1 including estimating EGR under throttled engine operation conditions based on a dynamic intake manifold model, measured intake manifold pressure and temperature, determined MAF and estimated CMF.

7. A method for repeatedly estimating intake manifold oxygen concentration during operation of a lean burn engine, the method comprising the steps of:
   (1) operating a state observer (SO) by combining determined air/fuel ratio (A/F) and mass air flow (MAF), and estimated cylinder mass flow (CMF) and exhaust gas recirculation flow (EGR) and calculating percent oxygen ($O_2$) in the intake manifold;
   (2) if intake manifold pressure is sufficiently less than atmospheric pressure (atm) to indicate throttled operation, continually repeating step 1; if not, operating an adaptive disturbance estimator (ADE) to correct disturbances and adjusting accordingly the values input to the SO and continually repeating steps 1 and 2.

* * * * *